United States Patent
Pudvah

(10) Patent No.: US 9,297,407 B2
(45) Date of Patent: Mar. 29, 2016

(54) FASTENER SYSTEM

(75) Inventor: Bernard W. Pudvah, Middletown, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 709 days.

(21) Appl. No.: 12/653,526

(22) Filed: Dec. 15, 2009

(65) Prior Publication Data

US 2011/0142565 A1    Jun. 16, 2011

(51) Int. Cl.
*F16B 41/00*    (2006.01)
*F16B 5/02*    (2006.01)

(52) U.S. Cl.
CPC ............... *F16B 41/002* (2013.01); *F16B 5/02* (2013.01)

(58) Field of Classification Search
USPC ................... 411/99, 353, 107, 517
See application file for complete search history.

(56) References Cited

U.S. PATENT DOCUMENTS

| | | | | |
|---|---|---|---|---|
| 1,115,947 | A * | 11/1914 | Lincoln | 310/415 |
| 2,616,733 | A * | 11/1952 | Strange | 411/352 |
| 2,764,266 | A * | 9/1956 | Haworth | 403/22 |
| 2,922,211 | A * | 1/1960 | Boyd | 411/551 |
| 2,949,143 | A * | 8/1960 | Shur | 411/353 |
| 3,062,253 | A * | 11/1962 | Miliheiser | 411/353 |
| 3,556,570 | A * | 1/1971 | Cosenza | 411/176 |
| 3,929,360 | A * | 12/1975 | Gulistan | 292/67 |
| 4,582,442 | A | 4/1986 | Rager | |
| 4,722,628 | A | 2/1988 | Rager | |
| 5,059,075 | A * | 10/1991 | Kelly | 411/107 |
| 5,061,869 | A * | 10/1991 | Stewart, Sr. | 310/89 |
| 5,380,136 | A | 1/1995 | Copple et al. | |
| 5,807,052 | A * | 9/1998 | Van Boven et al. | 411/353 |
| 5,890,382 | A | 4/1999 | Wang | |
| 6,736,578 | B2 * | 5/2004 | McIninch | 411/352 |
| 2008/0095593 | A1 | 4/2008 | McLean | |

FOREIGN PATENT DOCUMENTS

DE    10 2007 036 349 A1    2/2008
GB          838 620 A    2/1960

OTHER PUBLICATIONS

EP Office Action for EP Application 10252102.8 dated Dec. 19, 2013.

* cited by examiner

*Primary Examiner* — Flemming Saether

(74) *Attorney, Agent, or Firm* — Carlson, Gaskey & Olds P.C.

(57) ABSTRACT

A fastener system that when assembled prevents the assembly from accidently falling out of the housing. The fastener system includes a reduced shank bolt, a bushing with internal threads and a snap ring relief, a snap ring, and a housing modified to receive the bushing and the snap ring. The flange may have a flange relief to seat the snap ring when the fully engaged.

8 Claims, 2 Drawing Sheets

FASTENER SYSTEM

BACKGROUND OF THE INVENTION

This application relates to a fastener system. Fasteners are generally used to hold two items together generally through a bolt and nut system whereas the items to be joined are located between the bolt and nut. Additionally washers may be placed between the bolt and item and or between the nut and item to be joined. This spreads out the compressive force and prevents gauging of the item(s) being joined when torque is applied to the nut. In large radial assemblies the prior art fasteners are dispersed evenly around a 360 degree circumferential area and are subject to gravity which allows known fasteners to fall out into complex areas of the larger machine. There is a need in the industry for a fastener that overcomes this issue.

SUMMARY OF THE INVENTION

One aspect of the disclosure, the fastener system comprises a bushing, a bolt, a housing, a flange, and a snap ring. The bushing is slid into the housing and held in place via a snap ring. The bolt is fully threaded into the bushing. The bolt has a reduced diameter shank which allows the bolt to be fully threaded through the internal threads of the bushing. Once fully threaded through the bushing, the reduced shank on the bolt prevents the bolt from falling out of the bushing via axial contact of each component's threads. Both the bushing and bolt are capable of being retracted to provide clearance for the mating flange to be rotationally slid into place, while being prevented from falling out of the housing.

One aspect of the disclosure, a fastener system comprises a bushing having internal threads and a snap ring relief; a reduced shank bolt having external threads in a threaded region; a snap ring; and a housing having an internal bore and a recessed bore region, wherein when assembled the snap ring prevents the bushing from being removed from the housing and the internal threads prevent the reduced shank bolt from being removed from the bushing by contacting the male threads.

One aspect of the disclosure, the bushing has internal threads that are complimentary to the male threads of the reduced shank bolt.

One aspect of the disclosure, the bushing has a first end and a second end, an outer diameter and an inner diameter; the first end has on the outer diameter a shoulder, and on the inner diameter has internal threads. The bushing has proximal to the second end on the outer diameter a snap ring relief, and on the inner diameter a smooth internal bore extending from the second end to the internal threads. The housing has a recessed bore region formed in the internal bore and adapted to provide clearance for the snap ring.

One aspect of the disclosure, a method of assembling a fastener system comprises first inserting a bushing having a smooth outer bore and internal threads fully into a housing internal bore until the bushing shoulder contacts the housing; next expanding a snap ring beyond the housing's smooth outer bore outer diameter; next sliding the snap ring over the smooth outer bore until positioned over the snap ring relief; next relaxing the snap ring allowing it to seat into the snap ring relief; and finally threading a bolt having external threads into the bushing until the last external thread runs past the last bushing internal thread. The bolt may be threaded into the bushing prior to the bushing being inserted into the housing.

These and other features of the present disclosure can be best understood from the following specification and drawings, the following of which is a brief description.

DETAILED DESCRIPTION OF THE PREFERRED EMBODIMENTS

Figure 1:
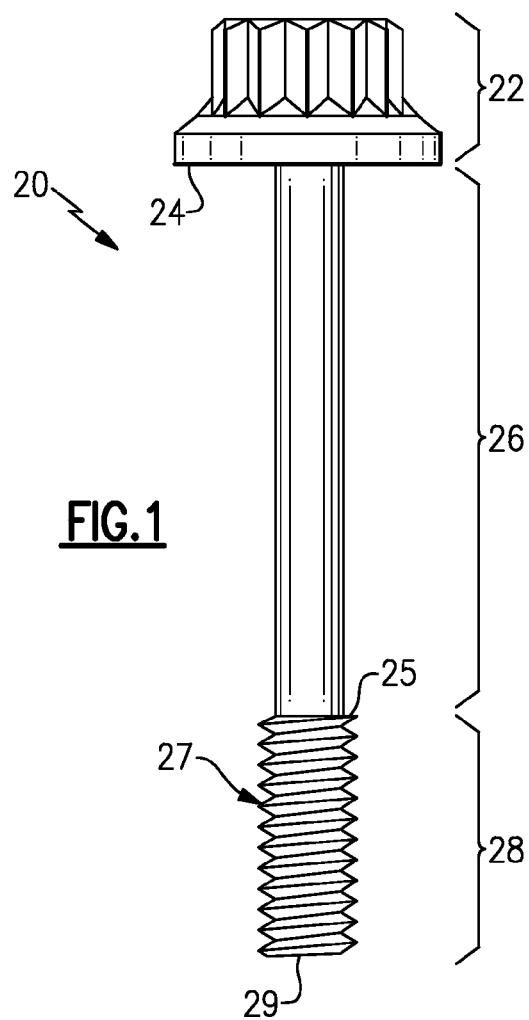
FIG. 1 shows a cross section of the bolt.

FIG. 1 shows a cross section of a bolt 20. On one end of the bolt 20 is a bolt head 22. The bolt head 22 contains a bolt shoulder 24. Extending away from the bolt head 22 is the reduced shank 26. The threaded region 28 begins where the reduced shank 26 ends with the first external thread 25, and terminates on the bolt end 29 opposite the bolt head 22. The threaded region 28 contains external threads 27. The reduced shank 26 diameter is equal or less than the smallest diameter of the threads in the bolt's threaded region 28.

Figure 2:
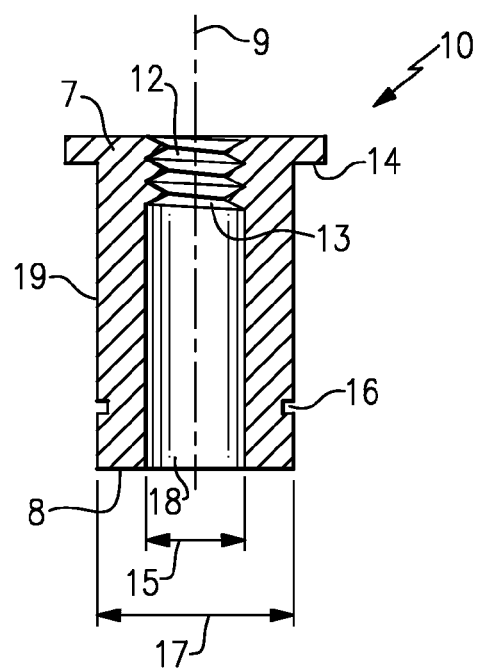
FIG. 2 shows a cross section of the bushing.

FIG. 2 shows a cross section of a bushing 10. The bushing 10 has an inner diameter 15 and an outer diameter 17. Internally on one end of the bushing 10 contains internal threads 12. The internal threads 12 end at the last internal thread 13, a smooth internal bore 18 begins and continues internally to the opposite end of the bushing 10. On the outer diameter 17 of the bushing 10 on the same end as the internal threads 12 is located a shoulder 14. The shoulder 14 extends past the outer diameter 17 and itself has a maximum diameter of the bolt 20. Where the shoulder 12 ends the smooth outer bore 19 begins and extends to the opposite end of the bushing 10. Located proximal to this end of the bushing 10 is a snap ring relief (i.e., groove) 16. This accepts the snap ring 40 during assembly of the fastener system.

The fastener system consists of the bushing 10, the bolt 20, the housing 30, the snap ring 40, and the flange 50. The bolt's threaded region 28 and the bushing's internal threads 12 may be of any pitch and may be either English or metric, as long as they are complimentary per assembly. The flange 50 is a piece with thickness.

Figure 3:
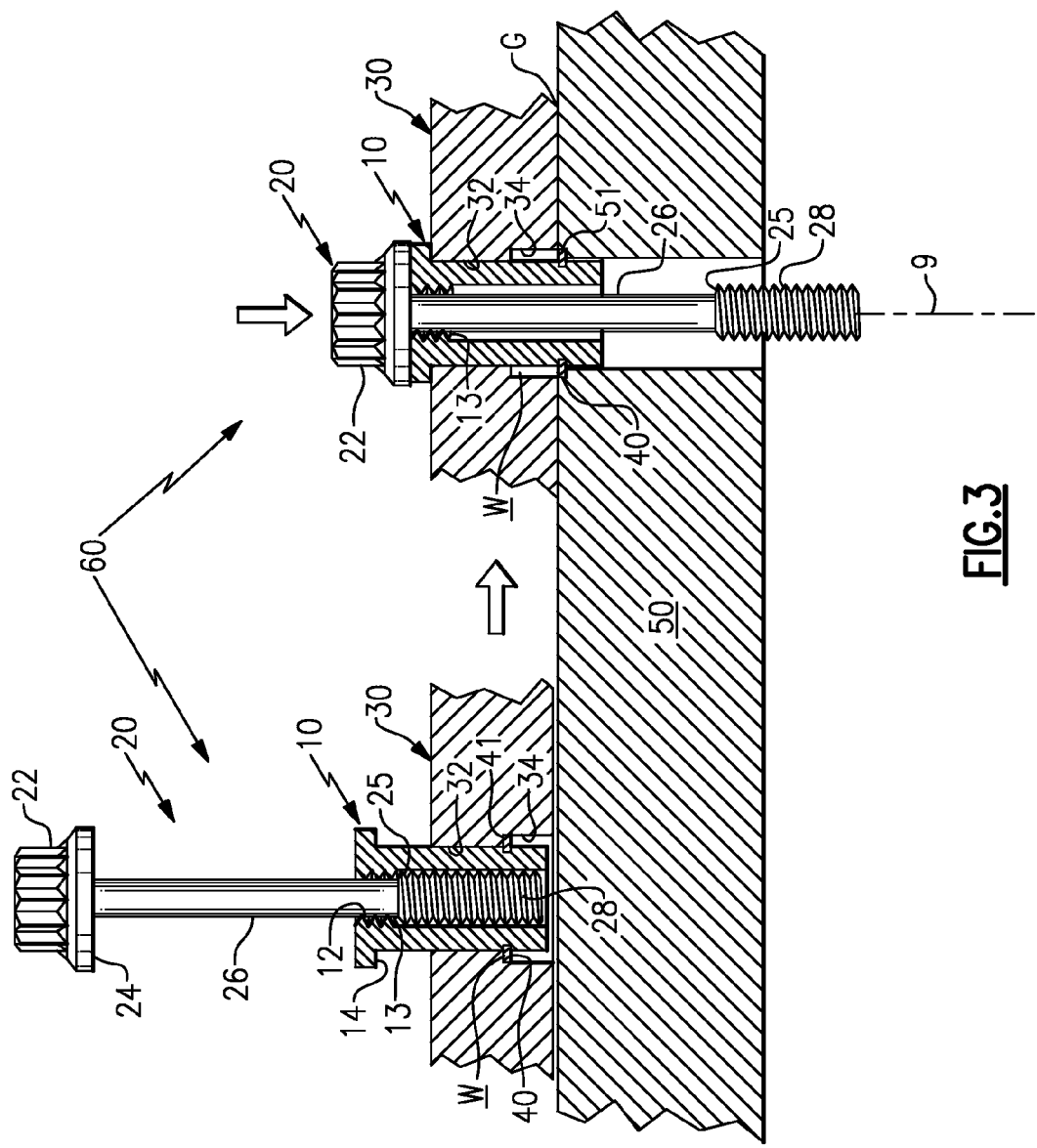
FIG. 3 shows a cross section of the housing with one instance of the fastener system fully retracted and another instance with the system fully engaged.

FIG. 3 shows a cross section of the fastener system 60 both fully retracted and fully engaged. The housing 30 has an internal, bore 32 which accepts the bushing 10. Once the bushing 10 has been fully inserted into the housing 30, the snap ring relief 16 (see FIG. 2) is exposed on the housing's 30 opposite end. This allows a user to expand a snap ring 40 and slide it over the bushings' 10 smooth external bore 19 until it relaxes back into its natural round shape inside the snap ring relief 16. The housing 30 and the bushing 10 become one article. The housing has a recessed bore region 34, having a length, which allows the bushing 10 and snap ring 40 to slide radially outward until the snap ring 40 contacts the area (e.g., shoulder 31) where the internal bore 32 and recessed bore region 34 meet. At this limit of travel, the end of the bushing 10 is flush with the housing 30.

FIG. 3's first instance shows a cross section of the fastener system fully retracted into the housing 30. The bolt 20 is at the limit of its travel because the internal threads 12 contact the external threads of the bolt at the beginning of the bolt's 20 threaded region 28. The bolt 20 can not be removed without unthreading that same distance, and the bolt 20 and bushing 10 thus become one article. It is the reduced shank 26 that allows the bolt 20 to fully thread past the internal threads 12 of the bushing 10. The snap ring 40 is contacting the shoulder which is formed where the internal bore 32 and recessed bore region 34 meet and thus prevent the bushing 10 from traveling further in a radially outward direction. This makes the bushing's 10 end flush with the housing 30. The flange 50 is then able to be slid into alignment. The bolt 20, bushing 10, snap ring 40 and housing 30 are now one article. The bolt 20, bushing 10, and snap ring 40 are now prevented from falling out of the housing 30 due to the effects of gravity.

FIG. 3's second instance shows a cross section of the fastener system fully engaged. Once the flange 50 aligns with the housing 30, the bushing 10 slides into place. The snap ring 40 rests into the flange relief 51 (i.e., shoulder)while the bushing shoulder 14 rests in the housing 30. The bolt's 20 reduced shank 26 allows the bolt 20 to travel past the bushing's 10 internal threads 12 until the bolt's 20 bolt shoulder 24 rests on the bushing 10. The threaded region 28 is exposed past the flange 50 and is ready to accept a washer (not shown) and nut (not shown). A gap G is disposed between the flange 50 and the housing 30 when the snap ring rests against the flange relief/shoulder 51 (see FIG. 3).

Although embodiments of this disclosure have been disclosed, a worker of ordinary skill in this art would recognize that certain modifications would come within the scope of the claims. For that reason, the following claims should be studied to determine the true scope and content of this invention.

What is claimed is:

1. A method of assembling a fastener system comprising:
    inserting a bushing having a smooth outer bore and a plurality of internal threads fully into a housing internal bore until a bushing shoulder contacts the housing and an end of said housing extends beyond said housing internal bore,
    placing a snap ring in a relief on an exterior of said bushing extending beyond the housing; and
    seating said ring against a shoulder within a piece.

2. The method of claim 1 further comprising the steps of:
    threading external threads of a bolt through said threads in said bushing, and
    pushing said external threads through said bushing.

3. The method of claim 2 further comprising:
    pushing said external threads through said piece.

4. A fastener system comprising:
    a bushing having internal threads and a snap ring relief;
    a reduced shank bolt having external threads in a threaded region;
    a snap ring;
    a housing having an internal bore and a recessed bore region;
    a piece adjacent said housing; and
    wherein, when the system is assembled, the snap ring prevents the bushing from being removed from the housing, and the last internal thread prevents the reduced shank bolt from being removed from the bushing by contacting a first male thread, and wherein the piece includes a shoulder that is adapted to accept and seat the snap ring in the piece.

5. A bushing for use in a fastener system including a housing, a piece adjacent said housing, a snap ring and a bolt with said snap ring seated in a shoulder in said piece, said bushing comprising:
    a body disposed along an axis, said body having
        a first end having a shoulder extending radially outwardly therefrom for engaging said housing;
        an outer surface having a relief therein, said relief configured to receive said snap ring,
        wherein the body defines a first bore having a first diameter extending a first distance along said axis from said first end, said first bore being threaded, and wherein a second bore extending from said first bore to a second end of said body, said second bore having a second diameter that is larger than said first diameter for allowing threads of said bolt to pass through said second bore without rotation.

6. A fastener assembly, said fastener assembly comprising:
    a housing having:
        a first length between a housing first end and a housing second end,
        a first bore disposed through said housing,
        a second bore disposed about said first bore, said second bore being wider than said first bore, wherein said second bore extends a first distance within said housing to said second end of said housing;
    a bushing having:
        a second length between a bushing first end and a bushing second end, wherein said second length is greater than said first length,
        an outer surface extending a second distance, said outer surface having a radially extending ring disposed within a relief therein, said ring and said bushing translatable axially within said second bore and translatable axially beyond said second end of said housing; and
    a piece adjacent said housing, said piece having
        a third bore receiving said bushing outer surface,
        a fourth bore that is wider than said fourth bore diameter, and,
        a shoulder between said third bore and fourth bore against which said ring sits if translated axially beyond said second end of said housing.

7. The fastener assembly of claim 6 wherein a gap is provided between said piece and said housing if said ring is seated against said shoulder.

8. The fastener assembly of claim 6 further comprising a bolt having a threaded bore and a smooth bore extending from said threaded bore to a head, said bolt having a length that extends said threaded end through said bushing said housing and said piece.

* * * * *